(12) United States Patent
Liu et al.

(10) Patent No.: US 10,853,967 B2
(45) Date of Patent: Dec. 1, 2020

(54) METHOD AND APPARATUS FOR DETERMINING PUPIL POSITION

(71) Applicant: BEIJING 7INVENSUN TECHNOLOGY CO., LTD., Beijing (CN)

(72) Inventors: Wei Liu, Beijing (CN); Dongchun Ren, Beijing (CN); Jian Wang, Beijing (CN); Fengmei Nie, Beijing (CN); Meng Yang, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/348,872

(22) PCT Filed: Dec. 12, 2018

(86) PCT No.: PCT/CN2018/120677
§ 371 (c)(1),
(2) Date: May 10, 2019

(87) PCT Pub. No.: WO2019/128715
PCT Pub. Date: Jul. 4, 2019

(65) Prior Publication Data
US 2020/0320735 A1 Oct. 8, 2020

(30) Foreign Application Priority Data

Dec. 27, 2017 (CN) .......................... 2017 1 1455783

(51) Int. Cl.
*G06K 9/00* (2006.01)
*G06T 7/73* (2017.01)
(Continued)

(52) U.S. Cl.
CPC .............. *G06T 7/73* (2017.01); *G06K 9/0061* (2013.01); *G06T 7/13* (2017.01); *G06T 7/64* (2017.01);
(Continued)

(58) Field of Classification Search
CPC .... G06T 7/73; G06T 7/13; G06T 7/64; G06T 2207/20036; G06T 2207/30196; G06K 9/0061
See application file for complete search history.

(56) References Cited

U.S. PATENT DOCUMENTS

2003/0007687 A1* 1/2003 Nesterov .............. H04N 9/3114
382/167
2015/0044649 A1* 2/2015 Voss ........................ G09B 7/02
434/236
(Continued)

FOREIGN PATENT DOCUMENTS

CN 103530618 A 1/2014
CN 103679180 A 3/2014
(Continued)

OTHER PUBLICATIONS

Chen, Jian et al. Pupil detection method based on ellipse fitting and parameter passing. Chinese Journal of Scientific Instrument. Aug. 31, 2014 (Aug. 31, 2014). No. 8 vol. 35. p. 1890-1899.

*Primary Examiner* — Charles T Shedrick
(74) *Attorney, Agent, or Firm* — Gang Yu

(57) ABSTRACT

The present disclosure discloses a method and apparatus for determining a pupil position. The method includes that: at least one first parameter of a pupil in an image, an initial edge region of the pupil and at least one second parameter of at least one light spot in the image are acquired; the initial edge region is corrected according to the at least one first parameter and the at least one second parameter to obtain a first edge region; a pupil edge region is determined accord-
(Continued)

ing to an edge section in the first edge region, and the edge section is a region formed by a point set meeting a first preset condition in the first edge region; and fitting processing is performed on the pupil edge region to obtain a position of the pupil.

20 Claims, 2 Drawing Sheets

(51) Int. Cl.
*G06T 7/13* (2017.01)
*G06T 7/64* (2017.01)

(52) U.S. Cl.
CPC ............... *G06T 2207/20036* (2013.01); *G06T 2207/30196* (2013.01)

(56) References Cited

U.S. PATENT DOCUMENTS

| | | | |
|---|---|---|---|
| 2015/0277553 A1* | 10/2015 | Zhang | G06K 9/00604 |
| | | | 382/165 |
| 2016/0026847 A1 | 1/2016 | Vugdelija et al. | |
| 2019/0121427 A1* | 4/2019 | Qin | G06F 3/013 |
| 2020/0193131 A1* | 6/2020 | Wang | G06K 9/0061 |

FOREIGN PATENT DOCUMENTS

| | | |
|---|---|---|
| CN | 104463159 A | 3/2015 |
| CN | 105094337 A | 11/2015 |
| CN | 106022315 A | 10/2016 |
| CN | 106203358 A | 12/2016 |
| CN | 106919933 A | 7/2017 |
| CN | 107871322 A | 4/2018 |
| CN | 108280403 A | 7/2018 |

* cited by examiner ined to further solve the technical problem of incapability in accurately positioning the pupil due to covering of the at least one glint.

METHOD AND APPARATUS FOR DETERMINING PUPIL POSITION

TECHNICAL FIELD

The present disclosure relates to the field of image processing, and in particular to a method and apparatus for determining a pupil position.

BACKGROUND

Along with rapid development of science and technology, information security has become a problem that people increasingly concern about. In a related art, an identity authentication manner is usually adopted to ensure information security. For example, identity authentication is performed through at least one biological feature such as at least one of a fingerprint and a face. Iris, as one of biological features, has advantages of uniqueness, stability, non-invasiveness, bioassay feasibility and the like. Therefore, an iris recognition technology is usually a research direction for biological feature recognition. In the iris recognition technology, accurately determining a pupil position is crucial to iris recognition accuracy. However, during a practical application, a light source of a camera may have certain influence on accurate positioning of a pupil. For example, in an image of an eye as shown in FIG. 1, there are two glints in the vicinity of a pupil, and due to covering of the glints, the pupil acquired by processing the image in the related art is not a complete pupil, so that the pupil may not be accurately positioned.

For a problem of incapability in accurately positioning a pupil due to covering of at least one glint, no effective solution has been provided yet.

SUMMARY

At, least some embodiments of the present disclosure provide a method and apparatus for determining a pupil position, so as at least to partially solve the technical problem of incapability in accurately positioning a pupil due to covering of at least one glint.

In an embodiment of the present disclosure, a method for determining pupil position is provided, which includes that: acquiring at least one first parameter of a pupil in an image, an initial edge region of the pupil and at least one second parameter of at least one glint in the image; correcting the initial edge region according to the at least one first parameter and the at least one second parameter to obtain a first edge region; determining a pupil edge region according to an edge section in the first edge region, and the edge section is a region formed by a point set meeting a first preset condition in the first edge region; and performing fitting processing on the pupil edge region to obtain a position of the pupil.

In another embodiment of the present disclosure, an apparatus for determining a pupil position is provided, which includes: an acquisition component, configured to acquire at least one first parameter of a pupil in an image, an initial edge region of the pupil and at least one second parameter of at least one glint in the image; a processing component, configured to correct the initial edge region according to the at least one first parameter and the at least one second parameter to obtain a first edge region; a determination component, configured to determine a pupil edge region according to an edge section in the first edge region, wherein the edge section is a region formed by a point set meeting a preset condition in the first edge region; and a fitting component, configured to perform fitting processing on the pupil edge region to obtain a position of the pupil.

In another embodiment of the present disclosure, a storage medium is also provided, which includes a stored program, the stored program executing the method for determining the pupil position.

In another embodiment of the present disclosure, a processor is also provided, which is configured to run a program, the program running to execute the method for determining the pupil position.

Through the at least some embodiments of the present disclosure, a manner of positioning the pupil according to a fitting result of the pupil edge region is adopted, the at least one first parameter of the pupil in the image, the initial edge region of the pupil and the at least one second parameter in the at least one glint in the image are acquired, the initial edge region is corrected according to the at least one first parameter and the at least one second parameter to obtain the first edge region, then the pupil edge region is determined according to an edge section in the first edge region, and finally, fitting processing is performed on the pupil edge region to obtain the position of the pupil, and the edge section is the region formed by the point set meeting the first preset condition in the first edge region, Therefore, a purpose of accurately positioning the pupil under covering of the at least one glint is achieved, and the technical problem of incapability in accurately positioning the pupil due to covering of the at least one glint is further solved.

BRIEF DESCRIPTION OF THE DRAWINGS

The drawings described here are adopted to provide a further understanding to the present disclosure and form a part of the present disclosure. Schematic embodiments of the present, disclosure and descriptions thereof are adopted to explain the present disclosure and not intended to form improper limits to the present disclosure. In the drawings.

DETAILED DESCRIPTION

In order to make those skilled in the art understand the solutions of the present disclosure better, the technical solutions in the embodiments of the present disclosure will be clearly and completely described below in combination with the drawings in the embodiments of the present disclosure. It is apparent that the described embodiments are not all embodiments but only a part of the embodiments of the present disclosure. All other embodiments acquired by those of ordinary skill in the art according to the embodiments in the present disclosure without creative work shall fall within the scope of protection of the present disclosure.

It is to be noted that terms "first", "second" and the like in the specification and claims of the present disclosure are adopted not to describe a specific sequence or order but to distinguish similar objects. It should be understood that data used like this may be exchanged under a proper condition for implementation of the embodiments of the present disclosure described here in sequences besides those shown or described herein. In addition, terms "include" and "have" and any transformation thereof are intended to cover non-exclusive inclusions. For example, a process, method, system, product or device including a series of steps or elements is not limited to those clearly listed steps or elements, but may include other steps or elements which are not clearly listed or inherent in the process, the method, the system, the product or the device.

Embodiment One

In an embodiment of the present disclosure, a method for determining a pupil position embodiment is provided. It is to be noted that the steps shown in the flowchart of the drawings may be executed in a computer system like a set of computer executable instructions, and moreover, although a logic sequence is shown in the flowchart, the shown or described steps may be executed in a sequence different from that described here under some conditions.

Figure 2:
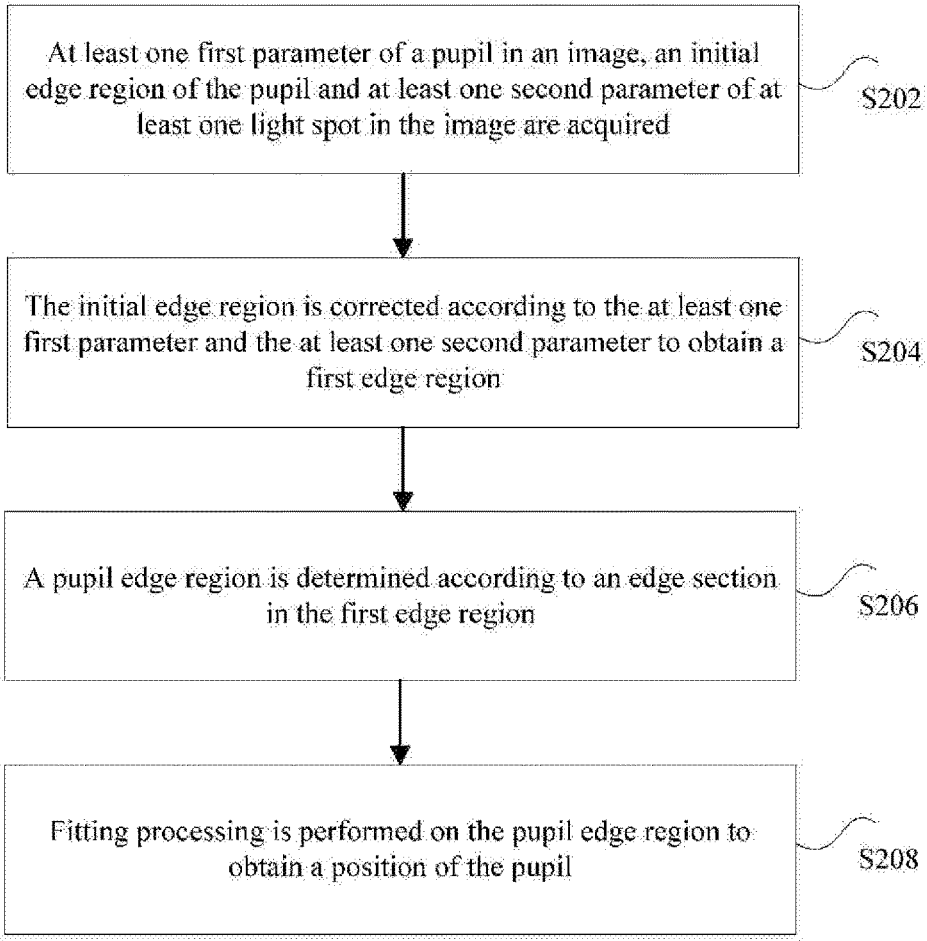
FIG. 2 is a flowchart of a method for determining a pupil position according to an embodiment of the present disclosure.

FIG. 2 is a flowchart of a method for determining pupil position according to an embodiment of the present disclosure. As shown in FIG. 2, the method includes the following steps.

At step S202, at least one first parameter of a pupil in an image, an initial edge region of the pupil and at least one second parameter of at least one glint in the image are acquired.

It is to be noted that the at least one first parameter includes at least one of an initial position of a pupil center and a radius of the pupil, and the at least one second parameter includes at least one of a position of each glint center and a radius of each glint.

Figure 1:
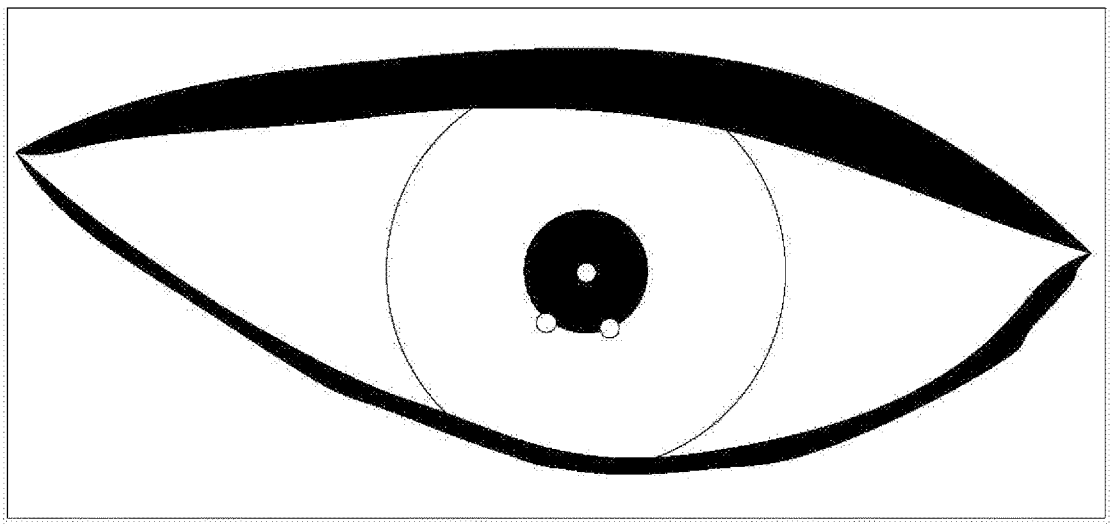
FIG. 1 is a schematic diagram of an image with lights spot according to an optional embodiment of the present disclosure.

In an optional embodiment, an image of an eye is input into an image processing device. There are glints in the image of the eye, for example, an image shown in FIG. 1. The image processing device, after acquiring the image, roughly segments the pupil and glints in the image by use of an image segmentation algorithm to obtain an initial position of a segmented pupil center, the radius of the pupil, the position of each glint center in the image and the radius of each glint. Then, edge extraction is performed on the image of the eye by use of an edge detection algorithm. An extracted edge is relatively cluttered, and the extracted edge not only includes a pupil edge, but also includes an eyelid, the glints and some other cluttered edges. That is, the extracted pupil edge is an edge region including the pupil edge and other interference edges. In addition, the image segmentation algorithm may be, but not limited to, a threshold-value-based segmentation algorithm, an edge-based segmentation algorithm, a region-based segmentation algorithm and the like. And the edge detection algorithm may be, but not limited to, a Roberts algorithm, a Sobel algorithm, a Prewitt algorithm, a Canny algorithm, a Log algorithm, an improved Sobel algorithm and the like.

At step S204, the initial edge region is corrected according to the at least one first parameter and the at least one second parameter to obtain a first edge region.

Specifically, the initial edge region may be filtered through a circular ring. Before the circular ring is used, the initial position of the pupil center is required to be adjusted. After the initial position of the pupil center is determined, the initial edge region is filtered by use of the circular ring, and a limiting condition is added to limit the filtered initial edge region, thereby preliminarily processing the glints and cluttered edges in the initial edge region of the pupil to obtain the first edge region.

At step S206, a pupil edge region is determined according to an edge section in the first edge region, and the edge section is a region formed by a point set meeting a first preset condition in the first edge region.

It is to be noted that, after the first edge region is acquired, the first edge region is required to be further filtered by use of the edge section in the first edge region to prevent the condition that the cluttered edges outside the pupil or the cluttered edges inside the pupil are not completely removed. The cluttered edges outside the pupil may be effectively removed by use of the edge section. Then, the cluttered edges inside the pupil are filtered by use of a morphological algorithm. After the cluttered edges outside the pupil and the cluttered edges inside the pupil are filtered, the pupil edge region including no cluttered edge or including a small number of cluttered edges may be acquired.

In addition, the first preset condition may be, but not limited to, a distance condition. For example, if a distance between a point A and point B in the first edge region is smaller than L and a distance between the point A and1 a point C is larger than L, the point A and the point B are divided into the same region, and the region is an edge section.

At step S208, fitting processing is performed on the pupil edge region to obtain a position of the pupil.

It is apparent that the acquired pupil edge region may not be a continuous closed region and the pupil edge region may include multiple discontinuous lines or point sets. Therefore, the fitting processing is performed on the acquired pupil edge region to obtain the pupil edge. Then, a circle or ellipse most approximate to a region contained in the pupil edge is determined, and a center coordinate of the pupil, i.e., the position of the pupil, may be determined according to a circle center of the acquired circle or a focal point of the ellipse.

Through the solution defined by S202 to S208, it can be seen that the at least one first parameter of the pupil in the image, the initial edge region of the pupil and the at least one second parameter of the at least one glint in the image are acquired, the initial edge region is corrected according to the at least one first parameter and the at least one second parameter to obtain the first edge region, then the pupil edge region is determined according to the edge section in the first edge region, and finally, fitting processing is performed on the pupil edge region to obtain the position of the pupil, and the edge section is the region formed by the point set meeting the first preset condition in the first edge region.

It is apparent that primary filtering may be performed on the initial edge region of the pupil through the at least one first parameter of the pupil and the at least one second parameter of the glint to, effectively filter most glints; and after primary filtering of the initial edge region is completed, secondary filtering is performed on the initial edge region according to the edge section in the first edge region, thereby further eliminating remaining glints and cluttered regions in the pupil edge region and achieving a technical effect of accurately determining the pupil edge region. Since the pupil edge region is accurately determined, the pupil edge region may be fitted on such a basis to accurately determine the pupil center and further achieve a purpose of accurately determining the pupil center under covering of the at least one glint.

From the above, it can be seen that, according to the present disclosure, a purpose of accurately positioning the pupil under covering of the at least one glint may be achieved and the technical problem of incapability in accurately positioning the pupil due to covering of the at least one glint is further solved.

In an optional embodiment, the initial position of the pupil center may be adjusted according to the at least one first parameter and the at least one second parameter. The circular ring is determined according to the adjusted initial position. And an initial edge of the pupil is processed by use of the circular ring. The operation that the initial edge region is corrected according to the at least one first parameter and the at least one second parameter to obtain the first edge region specifically includes the following steps.

At step S1040, the initial position of the pupil center is adjusted according to the at least one first parameter.

At step S1042, a first circular ring is acquired according to the adjusted initial position and the radius of the pupil.

At step S1044, the initial edge region is processed according to the first circular ring to obtain a second edge region.

At step S1046, the second edge region is processed according to at least one second preset condition to obtain the first edge region.

Specifically, an initial circular ring is determined according to the initial position of the pupil in the at least one first parameter, and then the initial position of the pupil center is adjusted according to the initial circular ring. After the adjusted initial position of the pupil center is acquired, an outer circle of the first circular ring is acquired by taking the adjusted initial position as a circle center and adding a first numerical value to the radius of the pupil, and an inner circle of the first circular ring is acquired by subtracting a second numerical value from the radius of the pupil. The first circular ring may be determined according to the acquired outer circle and inner circle. The initial edge of the pupil may be processed by use of the first circular ring to obtain the second edge region including the edge of the at least one glint and the cluttered edges in the vicinity of the pupil, and then the second edge region is limited by use of the at least one second preset condition, thereby acquiring the first edge region in which the edge of the at least one glint and the cluttered edges outside the pupil are removed.

It is to be noted that the first numerical value and the second numerical value may be the same and may also be different. And regional ranges of the first numerical value and the second numerical value may be, but not limited to, from three to four pixels.

Figure 3:
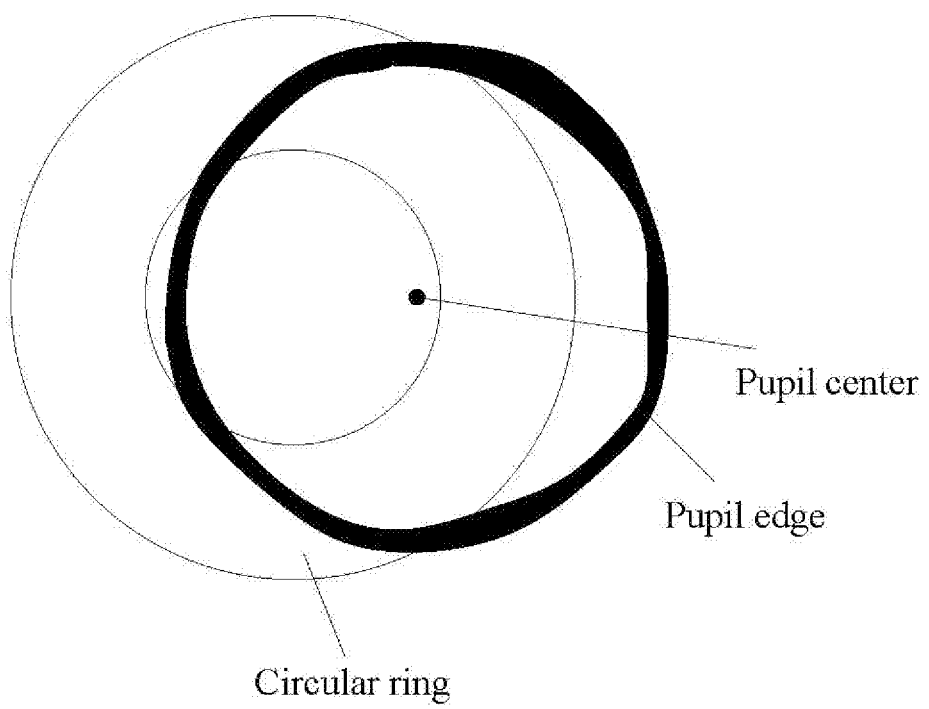
FIG. 3 is a schematic diagram of positions of a circular ring and a pupil according to an optional embodiment of the present disclosure.

In addition, it is also to be noted that the initial edge region may be corrected by use of the circular ring to obtain the pupil edge region with relatively few interference edges. When the initial edge region is processed by use of the circular ring, the pupil center is usually overlapped with a center of the circular ring, and thus the acquired pupil edge region includes relatively few interference edges. However, during a practical application, the pupil center is usually not overlapped with the center of the circular ring. FIG. 3 is a schematic diagram of positions of a circular ring and a pupil according to an optional embodiment of the present disclosure. As shown in this figure, the pupil center is not overlapped with the center of the circular ring, and moreover, the pupil edge does not completely fall within a region of the circular ring. For ensuring that the interference edges may be effectively filtered by use of the circular ring, the initial position of the pupil center is adjusted. The operation that the initial position of the pupil center is adjusted according to the at least one first parameter specifically includes the following steps.

At step S1040a, at least one candidate position of the pupil is determined according to the initial position of the pupil center.

At step S1040b, at least one second circular ring is acquired according to the at least one candidate position of the pupil and the radius of the pupil.

At step S1040c, at least one intersected region of the second circular ring and the initial edge region is determined.

At step S1040d, the number of rays in each of at least one intersected region is acquired, and the rays are acquired at an interval of a preset angle by taking each of the at least one candidate position as an endpoint.

At step S1040e, an intersected region with the largest number of rays is determined, and a candidate position corresponding to the intersected region with the largest number of rays is the adjusted initial position of the pupil center.

Specifically, multiple candidate points are determined as candidate positions of the pupil in a preset region around the initial position of the pupil center. An outer circle of a circular ring is acquired by taking a position of each candidate point as a circle center and adding the first numerical value to the radius of the pupil. An inner circle of the circular ring is acquired by adding the second numerical value to the radius of the pupil, and thus multiple circular rings, i.e., second circular rings, may be acquired. Then, rays are externally generated every 1° by taking each candidate point as an endpoint, and 360 rays may be generated. After that, the numbers of the rays in each of at least one intersected regions of the second circular rings and the initial edge region are determined, and the candidate position corresponding to the intersected region with the largest number of rays is determined as the adjusted initial position of the pupil center.

It is to be noted that, after the adjusted initial position of the pupil center is acquired, the first circular ring may be acquired according to the adjusted initial position and the radius of the pupil. The initial edge region in the first circular ring is determined as the second edge region. And the second edge region is limited by use of the at least one second preset condition. The at least one second preset condition includes a distance limiting condition and a gray-scale limiting condition.

Specifically, the first edge region is acquired by performing first filtering processing on at least one edge point in the second edge region according to the distance limiting condition and performing second filtering processing on the second edge region subjected to the first filtering processing according to the gray-scale limiting condition. Or, the first edge region is acquired by performing second filtering processing on the at least one edge point in the second edge region according to the gray-scale limiting condition and performing the first filtering processing on the first edge region subjected to the second filtering processing according to the distance limiting condition.

The distance limiting condition is:

$$\text{Distanconglint}_i \leq \alpha * \text{glintradius}_i,$$

where $\text{Distanconglint}_i$ is a distance between an edge point in the second edge region and a position of a center of an ith glint, $\text{glintradius}_i$ is a radius of the ith glint, and $\alpha$ is a preset constant.

The gray-scale limiting condition is:

ConGray≥MinGray*1.5+15, where ConGray is a gray-scale value of an edge point in the second edge region, and MinGray is a minimum gray-scale value in the image.

It is to be noted that the edge of each glint may be effectively filtered by use of the distance limiting condition and the cluttered edges outside the pupil may be effectively filtered by use of the gray-scale limiting condition. So far, most of the edge of each glint and most of the cluttered edges outside the pupil have been effectively filtered.

In addition, it is also to be noted that, for effectively filtering the cluttered edges outside the pupil, it is necessary to execute an, operation of removing at least one isolated edge point on the first edge region and determine the pupil edge region according to the edge section in the first edge region. The operation that the pupil edge region is determined according to the edge section in the first edge region includes the following steps.

At step S1060, the edge section in the first edge region is acquired.

At step S1062, the first edge region is processed according to the edge section in the first edge region to obtain a third edge region.

At step S1064, a convex hull of the third edge region is processed to obtain a fourth edge region.

At step S1066, the pupil edge region is acquired according to the third edge region and the fourth edge region.

Specifically, the operation that the first edge region is processed according to the edge section in the first edge region to obtain the third edge region includes the following steps.

At Step A, a first edge section in the first edge region is acquired, and the first edge section is the longest edge section in the first edge region.

At Step B, a first enclosing circle is acquired according to the first edge section.

At Step C, a second edge section in the first edge region is acquired, and the second edge section and the first edge section are combined to obtain a third edge section, and the second edge section is an edge section in the first edge region.

At Step D, a second enclosing circle is acquired according to the third edge section.

At Step E, when a difference value between a radius of the first enclosing circle and a radius of the second enclosing circle is larger than a preset difference value, the second edge section is removed, and Step C is re-executed to re-acquire the second edge section in the first edge region.

At Step F, when the difference value is less than or equal to the preset difference value, the third edge section is updated to the first edge section.

Step A to Step F are repeatedly executed until each edge section of which a length is smaller than a preset length in the first edge region is traversed. Herein, the third edge region is acquired according to the updated first edge section, That is, under the condition of each edge section of which the length is smaller than the preset length in the first edge region is traversed, the third edge region is acquired according to the updated first edge section. And under the condition of each edge section of which the length is smaller than the preset length in the first edge region is not traversed, the updated first edge section is acquired, and the third edge section is updated according to the updated first edge section.

In an optional embodiment, the first edge region includes 10 edge sections, and an edge section with the largest length is selected as the first edge section. Then the smallest circle capable of enclosing the first edge section is determined to obtain the first enclosing circle. And meanwhile, the circle center and radius of the first enclosing circle are acquired. Then, any other edge section in the first edge region is added into the first edge section, thereby acquiring the third edge section. Similarly, the smallest circle capable of enclosing the third edge section is determined to obtain the second enclosing circle. When the difference value between the radius of the first enclosing circle and the radius of the second enclosing circle is less than or equal to the preset difference value, Steps B, C and D are continuously executed by taking the third edge section as the longest edge section. When the difference value between the radius of the first enclosing circle and the radius of the second enclosing circle is larger than the preset difference value, the second edge section is removed, meanwhile, an edge section is selected from the remaining edge sections and added into the first edge section, and Steps B, C and D are continuously executed until all of the edge sections in the first edge region are traversed.

It is to be noted that, after the third edge region is acquired, the edge of each glint and the cluttered edges outside the pupil have been completely extracted but some cluttered edges still exist in the pupil. The cluttered edges in the pupil may also bring influence to fitting of the pupil. Therefore, it is also necessary to further filter the third edge region. Herein, the convex hull of the third edge region may be processed to obtain the fourth edge region in which the cluttered edges in the pupil are removed. A specific method is as follows.

At step S1064a, the convex hull of the third edge region is determined.

At step S1064b, an edge of the first edge region is extracted according to the convex hull of the third edge region.

At step S1064c, the fourth edge region is determined according to the edge of the third edge region.

It is to be noted that the image processing device may acquire the convex hull of the third edge region and then extract an edge of the convex hull of the third edge region, and the edge of the convex hull is the fourth edge region.

In addition, after the third edge region is acquired, the pupil edge region may be acquired according to the third edge region and the fourth edge region specifically as follows.

At step S1066a, morphological processing is performed on the fourth edge region to obtain a fifth edge region.

At step S106613, an overlapped region of the third edge region and the fifth edge region is acquired.

At step S1066c, the pupil edge region is determined according to the overlapped region.

It is to be noted that operation for the morphological processing in the image processing includes expansion, corrosion, opening operation and closing operation.

Specifically, expansion processing is respectively performed on an exterior and interior of the fourth edge region by taking a preset number of pixels as a unit, thereby acquiring the fifth edge region. And then an operation of solving an intersection is executed on the third edge region and the fifth edge region to obtain the overlapped region, and the overlapped region is the finally determined pupil edge region.

In addition, it is also to be noted that the cluttered edges in the pupil may be effectively removed by the operations.

After the pupil edge region is acquired, fitting processing is further performed on the pupil edge region, so that a contour of the pupil edge may be acquired. Furthermore, a circle center of a circle of which a contour is most approximate to the contour of the pupil edge is the position of the pupil, and a radius of the circle is the radius of the pupil. Under the condition that the radius of the pupil is larger than a preset radius, ellipse fitting processing is performed on the pupil edge region to obtain the position of the pupil. Under the condition that the radius of the pupil is less than or equal to the preset radius, circle fitting processing is performed on the pupil edge region to obtain the position of the pupil. It is apparent that performing data fitting in different forms for different pupil radiuses may obtain a more accurate fitting result, and furthermore, the position of the pupil may be determined accurately.

Embodiment Two

Figure 4:
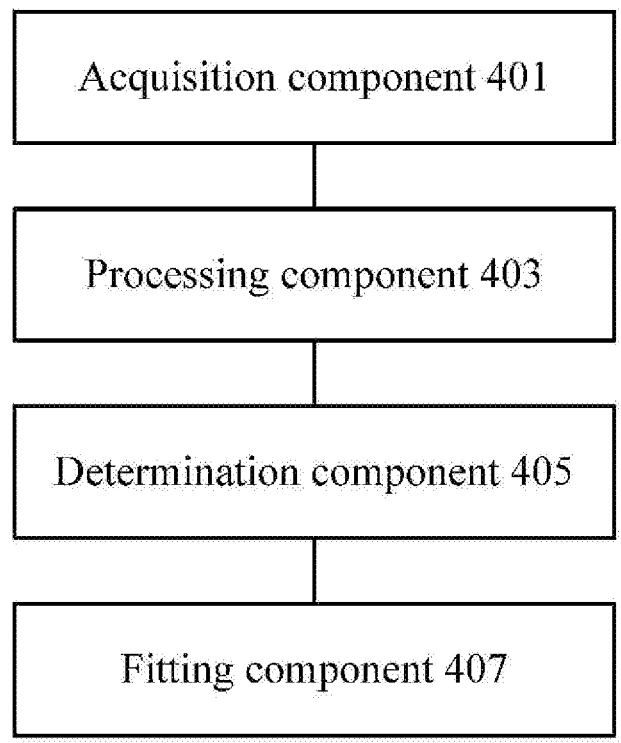
FIG. 4 is a structural schematic diagram of an apparatus for determining a pupil position according to an embodiment of the present disclosure.

In another embodiment of the present disclosure, an apparatus for determining a pupil position is also provided. FIG. 4 is a structural schematic diagram of an apparatus for determining a pupil position according to an embodiment of the present disclosure. As shown in FIG. 4, the apparatus includes an acquisition component 401, a processing component 403, a determination component 405 and a fitting component 407.

The acquisition component 401 is configured to acquire at least one first parameter of a pupil in an image, an initial edge region of the pupil and at least one second parameter of at least one glint in the image. The processing component 403 is configured to correct the initial edge region according to the at least one first parameter and the at least one second parameter to obtain a first edge region. The determination component 405 is configured to determine a pupil edge region according to an edge section in the first edge region, and the edge section is a region formed by a point set meeting a first preset condition in the first edge region. The fitting component 407 is configured to perform fitting processing on the pupil edge region to obtain a position of the pupil.

It is to be noted that the acquisition component 401, the processing component 403, the determination component 405 and the fitting component 407 correspond to step S202 to step S208 in embodiment one and the four components implement an example and application scenario the same as those implemented by the corresponding steps but are not limited to the contents disclosed in embodiment one.

In an optional embodiment, the at least one first parameter includes at least one of an initial position of a pupil center and a radius of the pupil, and the at least one second parameter includes at least one of a position of each glint center and a radius of each glint.

In an optional embodiment, the processing component includes an adjustment component, a first processing component, a second processing component and a third processing component. The adjustment component is configured to adjust the initial position of the pupil center according to the at least one first parameter to obtain a adjusted initial position. The first processing component is configured to obtain a first circular ring according to the adjusted initial position and the radius of the pupil. The second processing component is configured to process the initial edge region according to the first circular ring to obtain a second edge region; and the third processing component is configured to process the second edge region according to at least one second preset condition to obtain the first edge region.

It is to be noted that the adjustment component, the first processing component, the second processing component and the third processing component correspond to step S1040 to step S1046 in embodiment one and the four components implement an example and application scenario the same as those implemented by the corresponding steps but are not limited to the contents disclosed in embodiment one.

In an optional embodiment, the adjustment component includes a first determination component, a fourth processing component, a second determination component, a first acquisition component and a fourth determination component. The first determination component is configured to determine at least one candidate position of the pupil according to the initial position of the pupil center. The fourth processing component is configured to obtain at least one second circular ring according to the at least one candidate position of the pupil and the radius of the pupil. The second determination component is configured to determine at least one intersected region of the second circular ring and the initial edge region. The first acquisition component is configured to acquire the number of rays in each of at least one intersected region, and the rays are acquired at an interval of a preset angle by taking each of the at least one candidate position as an endpoint. The fourth determination component is configured to determine an intersected region with the largest number of rays, and the candidate position corresponding to the intersected region with the largest number of rays is the adjusted initial position of the pupil center.

It is to be noted that the first determination component, the fourth processing component, the second determination component, the first acquisition component and the fourth determination component correspond to step S1040a to step S1040e in embodiment one and the five components implement an example and application scenario the same as those implemented by the corresponding steps but are not limited to the contents disclosed in embodiment one.

In an optional embodiment, the at least one second preset condition includes a distance limiting condition and a gray-scale limiting condition, and the third processing component includes a first filtering component or a second filtering component. The first filtering component is configured to perform first filtering processing on at least one edge point in the second edge region according to the distance limiting condition and perform second filtering processing on the second edge region subjected to the first filtering processing according to the gray-scale limiting condition to obtain the first edge region. The second filtering component is configured to perform second filtering processing on the at least one edge point in the second edge region according to the gray-scale limiting condition and perform first filtering processing on the first edge region subjected to the second filtering processing according to the distance limiting condition to obtain the first edge region.

In an optional embodiment, the distance limiting condition is:

$$Distanconglint_i \leq \alpha * glintradius_i$$

where $Distanconglint_i$ is a distance between an edge point in the second edge region and a position of a center of an ith glint, $glintradius_i$ is a radius of the ith glint, and $\alpha$ is a preset constant.

In an optional embodiment, the gray-scale limiting condition is:

$$ConGray \geq MinGray * 1.5 + 15,$$

where ConGray is a gray-scale value of the edge point in the second edge region, and MinGray is a minimum gray-scale value in the image.

In an optional embodiment, the determination component includes a second acquisition component, a fifth processing component, a sixth processing component and a seventh processing component. The second acquisition component is configured to acquire the edge section in the first edge region. The fifth processing component is configured to process the first edge region according to the edge section in the first edge region to obtain a third edge region. The sixth processing component is configured to process a convex hull of the third edge region to obtain a fourth edge region. The seventh processing component is configured to obtain the pupil edge region according to the third edge region and the fourth edge region.

It is to be noted that the second acquisition component, the fifth processing component, the sixth processing component and the seventh processing component correspond to step S1060 to step S1066 in embodiment one and the four components implement an example and application scenario the same as those implemented by the corresponding steps but are not limited to the contents disclosed in embodiment one.

In an optional embodiment, the fifth processing component executes the following steps: Step A, acquiring a first edge section in the first edge region, and the first edge section is the longest edge section in the first edge region; Step B, acquiring a first enclosing circle according to the first edge section; Step C, acquiring a second edge section in the first edge region, and combining the second edge section and the first edge section to obtain a third edge section, and the second edge section is an edge section in the first edge region; Step D, acquiring a second enclosing circle according to the third edge section; Step E, when a difference value between a radius of the first enclosing circle and a radius of the second enclosing circle is larger than a preset difference value, removing the second edge section, and re-executing Step C to re-acquire the second edge section in the first edge region; Step F, when the difference value is less than or equal to the preset difference value, updating the third edge section to the first edge section; and repeating Step A to Step F until each edge section of which the length is smaller than a preset length in the first edge region is traversed, and the third edge region is acquired according to the updated first edge section. That is, under the condition of each edge section of which the length is smaller than the preset length in the first edge region is traversed, the third edge region is acquired according to the updated first edge section. Under the condition of each edge section of which the length is smaller than the preset length in the first edge region is not traversed, the updated first edge section is acquired, and the third edge section is updated according to the updated first edge section.

In an optional embodiment, the sixth processing component includes a fifth determination component, an extraction component and a sixth determination component. The fifth determination component is configured to determine the convex hull of the third edge region. The extraction component is configured to extract an edge of the third edge region according to the convex hull of the third edge region. The sixth determination component is configured to determine the fourth edge region according to the edge of the third edge region.

It is to be noted that the fifth determination component, the extraction component and the sixth determination component correspond to step S1064a to step S1064c in embodiment one and the three components implement an example and application scenario the same as those implemented by the corresponding steps but are not limited to the contents disclosed in embodiment one.

In an optional embodiment, the seventh processing component includes an eighth processing component, a third acquisition component and a seventh determination component. The eighth processing component is configured to perform morphological processing on the fourth edge region to obtain a fifth edge region. The third acquisition component is configured to acquire an overlapped region of the third edge region and the fifth edge region. The seventh determination component is configured to determine the pupil edge region according to the overlapped region.

It is to be noted that the eighth processing component, the third acquisition component and the seventh determination component correspond to step S1066a to step S1066c in embodiment one and the three components implement an example and application scenario the same as those implemented by the corresponding steps but are not limited to the contents disclosed in embodiment one.

In an optional embodiment, the fitting component includes a first fitting component and a second fitting component. The first fitting component is configured to, under the condition that the radius of the pupil is larger than a preset radius, perform ellipse fitting processing on the pupil edge region to obtain the position of the pupil. The second fitting component is configured to, under the condition that the radius of the pupil is less than or equal to the preset radius, perform circle fitting processing on the pupil edge region to obtain the position of the pupil.

Embodiment Three

In another embodiment of the present disclosure, a storage medium is also provided, which includes a stored program, the stored program executing the method for determining the pupil position in embodiment one.

Embodiment Four

In another embodiment of the present disclosure, a processor is also provided, which is configured to run a program, the program running to execute the method for determining the pupil position in embodiment one.

The sequence numbers of the embodiments of the present disclosure are adopted for description and do not represent superiority-inferiority of the embodiments.

In the embodiments of the present disclosure, the descriptions of the embodiments focus on different aspects. The part which is not described in a certain embodiment in detail may refer to the related description of the other embodiments.

In some embodiments provided in the present disclosure, it should be understood that the disclosed technical contents may be implemented in other manners. Herein, the apparatus embodiment described above is only schematic. For example, division of the elements is only division of logical functions, and other division manners may be adopted during practical implementation. For example, multiple elements or components may be combined or integrated to another system, or some features may be ignored or are not executed. In addition, shown or discussed coupling, direct coupling or communication connection may be implemented through indirect coupling or communication connection of some interfaces, elements or components, and may be in an electrical form or other forms.

The elements described as separate parts may or may not be separate physically, and parts displayed as elements may or may not be physical elements, that is, they may be located in the same place, or may also be distributed to multiple elements. Part or all of the elements may be selected to achieve the purpose of the solutions of the embodiments according to, a practical requirement.

In addition, each functional element in each embodiment of the present disclosure may be integrated into a processing element, each element may also physically exist independently, and two or more than two elements may also be integrated into an element. The integrated element may be implemented in a hardware form and may also be implemented in form of software functional element.

If being implemented in form of software functional element and sold or used as an independent product, the integrated element may be stored in a computer-readable storage medium. Based on such an understanding, the technical solutions of the present disclosure substantially or parts making contributions to the related art or all or part of the technical solutions may be embodied in form of software product. The computer software product is stored in a storage medium, including a plurality of instructions configured to enable a computer device (which may be a personal computer, a server, a network device or the like) to execute all or part of the steps of the method in each embodiment of the present disclosure. The storage medium includes various media capable of storing program codes such as a U disk, a Read-Only Memory (ROM), a Random Access Memory (RAM), a mobile hard disk, a magnetic disk or an optical disk.

The above are exemplary embodiments of the present disclosure. It is to be pointed out that those of ordinary skill in the art may also make a number of improvements and embellishments without departing from the principle of the invention and these improvements and embellishments shall also fall within the scope of protection of the present disclosure.

INDUSTRIAL APPLICABILITY

The solutions provided in the embodiments of the present disclosure may be applied to the image processing field. The pupil is positioned through the fitting result of the pupil edge region, so that the technical problem of incapability in accurately positioning the pupil due to covering of the at least one glint is solved, and accuracy of pupil positioning under covering of the at least one glint is improved.

What is claimed is:

1. A method for determining a pupil position, comprising:
   acquiring at least one first parameter of a pupil in an image, an initial edge region of the pupil and at least one second parameter of at least one light spot in the image;
   correcting the initial edge region according to the at least one first parameter and the at least one second parameter to obtain a first edge region;
   determining a pupil edge region according to an edge section, in the first edge region, wherein the edge section is a region formed by a point set meeting a first preset condition in the first edge region; and
   perforating fitting processing on the pupil edge region to obtain a position of the pupil.

2. The method as claimed in claim 1, wherein the at least one first parameter comprises at least one of an initial position of a pupil center and a radius of the pupil, and the at least one second parameter comprises at least one of a position of each light spot center and a radius of each light spot.

3. The method as claimed in claim 2, wherein correcting the initial edge region according to the at least one first parameter and the at least one second parameter to obtain the first edge region comprises:
   adjusting the initial position of the pupil center according to the at least one first parameter to obtain a adjusted initial position;
   acquiring a first circular ring according to the adjusted initial position and the radius of the pupil;
   processing the initial edge region according to the first circular ring to obtain a second edge region; and
   processing the second edge region according to at least one second preset condition to obtain the first edge region.

4. The method as claimed in claim 3, wherein adjusting the initial position of the pupil center according to the at least one first parameter comprises:
   determining at least one candidate position of the pupil according to the initial position of the pupil center;
   acquiring at least one second circular ring according to the at least one candidate position of the pupil and the radius of the pupil;
   determining at least one intersected region of the second circular ring and the initial edge region;
   acquiring the number of rays in each of at least one intersected region, wherein the rays are, acquired at an interval of a preset angle by taking each of the at least one candidate position as an endpoint; and
   determining an intersected region with the largest number of rays, wherein a candidate position corresponding to the intersected region with the largest number of rays is the adjusted initial position of the pupil center.

5. The method as claimed in claim 3, wherein the at least one second preset condition comprises a distance limiting condition and a gray-scale limiting condition, and processing the second edge region according to the at least one second preset condition to obtain the first edge region comprises:
   performing first filtering processing on at least one edge point in the second edge region according to the distance limiting condition and performing second filtering processing on the second edge region subjected to the first filtering processing, according to the gray-scale limiting condition to obtain the first edge region; or,
   performing second filtering processing on the at least one edge point in the second edge, region according to the gray-scale limiting condition and performing first filtering processing on the second edge region, subjected to the second filtering processing according to the distance limiting condition to obtain the first edge region.

6. The method as claimed, in claim 2, wherein determining the pupil edge region according to the edge section in the first edge region comprises:
   acquiring the edge section in the first edge region;
   processing the first edge region according to the edge section in the first edge region to obtain a third edge region;
   processing a convex hull of the third edge region to obtain a fourth edge region; and
   acquiring the pupil edge region according to the third edge region and the fourth edge region.

7. The method as claimed in claim 6, wherein processing the first edge region according to the edge section in the first edge region to obtain the third edge region comprises:
  acquiring a first edge section in the first edge region, wherein the first edge section is the longest edge section in the first edge region;
  acquiring a first enclosing circle according to the first edge section;
  acquiring a second edge section in the first edge region, and combining the second edge section and the first edge section to obtain a third edge section;
  acquiring a second enclosing circle according to the third edge section;
  when a difference value between a radius of the first enclosing circle and a radius of the second enclosing circle is larger than a preset difference value removing the second edge section, and re-acquiring the second edge section in the first edge region;
  when the difference value is less than or equal to the preset difference value, updating the third edge section to the first edge section to obtain an updated first edge region;
  under the condition of each edge section of which a length is smaller than a preset length in the first edge region is traversed, acquiring the third edge region according to the updated first edge region; and
  under the condition of each edge section of which a length is smaller than the preset, length in the first edge region is not traversed, acquiring the updated first edge section, and updating the third edge section according to the updated first edge section.

8. The method as claimed in claim 6, wherein processing the convex hull of the third edge region to obtain the fourth edge region comprises:
  determining the convex hull of the third edge region;
  extracting an edge of the third edge region according to the convex hull of the third edge region; and
  determining, the fourth edge region according to the edge of the third edge region.

9. The method as claimed in claim 6, wherein determining the pupil edge region according to the third edge region and the fourth edge region comprises:
  performing morphological processing on the fourth edge region to obtain a fifth edge region;
  acquiring an overlapped region of the third edge region and the fifth edge region; and
  determining the pupil edge region according to the overlapped region.

10. The method as claimed in claim 2, wherein performing the fitting processing on the pupil edge region to obtain the position of the pupil comprises:
  under the condition that the radius of the pupil is larger than a preset radius, performing ellipse fitting, processing on the pupil edge region to obtain the position of the pupil; and
  under the condition that the radius of the pupil is less than or equal to the preset radius, performing circle fitting processing on the pupil edge region to obtain the position of the pupil.

11. An apparatus for determining a pupil position, comprising:
  an acquisition component, configured to acquire at least one first parameter of a pupil in an image, an initial edge region of the pupil and at least one second parameter of at least one light spot in the image;
  a processing component, configured to correct the initial, edge region according to the at least one first parameter and the at least one second, parameter to obtain a first edge region;
  a determination component, configured to determine a pupil edge region according to an edge section in the first edge region, wherein the edge section is a region formed by a point set meeting a preset condition in the first edge region; and
  a fitting component, configured to perform fitting processing on the pupil edge region to obtain a position of the pupil.

12. The apparatus as claimed in claim 11, wherein the at least one first parameter comprises at least one of an initial position of a pupil center and a radius of the pupil, and the at least one second parameter comprises at least one of a position of each light spot center and a radius of each light spot.

13. The apparatus as claimed in claim 12, wherein the processing component comprises:
  an adjustment component, configured to adjust the initial position of the pupil center according to the at least one first parameter to obtain a adjusted initial position;
  a first processing component, configured to obtain a first circular ring according, to the adjusted initial position and the radius of the pupil;
  a second processing component, configured to process the initial edge region according to the first circular ring to obtain a second edge region; and
  a third processing component, configured to process the second edge region according to at least one second, preset condition to obtain the first edge region.

14. The apparatus as claimed in claim 13, wherein the adjustment component comprises:
  a first determination component, configured to determine at least one candidate position of the pupil according to the initial position of the pupil center;
  a fourth processing component, configured to obtain at least one second circular ring according to the at least one candidate position of the pupil and the radius of the pupil;
  a second determination component, configured to determine at least one intersected region of the second circular ring and the initial edge region;
  a first acquisition component, configured to acquire the number of rays in each of at least one intersected region, wherein the rays are acquired at an interval of a preset angle by taking each of the at least one candidate position as an endpoint; and
  a fourth determination component, configured to determine an intersected region with the largest number of rays, wherein a candidate position corresponding to the intersected region with the largest number of rays is the adjusted initial position of the pupil center.

15. The apparatus as claimed in claim 13, wherein the at least one second preset condition comprises a distance limiting condition and a gray-scale limiting, condition, and the third, processing component comprises:
  a first filtering component, configured to perform first filtering processing on at least one edge point in the second edge region according to the distance limiting condition and perform second filtering processing on the second edge region subjected to the first filtering processing according to the gray-scale limiting condition to obtain the first edge region; or,
  a second filtering component, configured to perform second filtering processing on the at least one edge point, in the second edge region according to the gray-scale limiting condition and perform first filtering processing on the second edge region subjected to the second filtering processing according to the distance limiting condition to obtain the first edge region.

16. The apparatus as claimed in claim 12, wherein the determination component comprises:
a second acquisition component, configured to acquire the edge section in the first edge region;
a fifth processing, component, configured to process the first edge region according to the edge section in the first edge region to obtain a third edge region;
a sixth processing component, configured to process a convex hull of the third edge region to obtain a fourth edge region; and
a seventh processing component, configured to obtain the pupil edge region according to the third edge region and the fourth edge region.

17. The apparatus as claimed in claim 16, wherein the fifth processing component executes the following steps:
acquiring a first edge section in the first edge region, wherein the first edge section is the longest edge section in the first edge region;
acquiring a first enclosing circle according to the first edge section;
acquiring a second edge section in the first edge region, and combining the second edge section and the first edge section to obtain a third edge section;
acquiring a second enclosing circle according to the third edge section;
when a difference value between a radius of the first enclosing circle and a radius of the second enclosing, circle is larger than a preset difference value, removing the second edge section, and re-acquiring the second edge section in the first edge region;
when the difference value is less than or equal to the preset difference value, updating the third edge section to the first edge section;
under the condition of each edge section of which a length is smaller than a preset length in the first edge region is traversed, acquiring the third edge region according to the updated first edge region; and
under the condition of each edge section of which the length is smaller than the preset length in the first edge region is not traversed, acquiring the updated first edge section, and updating the third edge section according to the updated first edge section.

18. The apparatus as claimed in claim 16, wherein the sixth processing component comprises:
a fifth determination component, configured to determine the convex hull of the third edge region;
an extraction component, configured to extract an edge of the third edge region according to the convex hull of the third edge region; and
a sixth determination component, configured to determine the fourth edge region according to the edge of the third edge region.

19. The apparatus as claimed in claim 16, wherein the seventh processing component comprises:
an eighth processing component, configured to perform morphological processing on the fourth edge region to obtain a fifth edge region;
a third acquisition component, configured to acquire an overlapped region of the third edge region and the fifth edge region; and
a seventh determination component, configured to determine the pupil edge region according to the overlapped region.

20. The apparatus as claimed in claim 12, wherein the fitting component comprises:
a first fitting component, configured to, under the condition that the radius of the pupil is larger than a preset radius, perform ellipse fitting processing on the pupil edge region to obtain the position of the pupil; and
a second fitting component, configured to, under the condition that the radius of the pupil is less than or equal to the preset radius, perform circle fitting processing on the pupil edge region to obtain the position of the pupil.

* * * * *